UNITED STATES PATENT OFFICE.

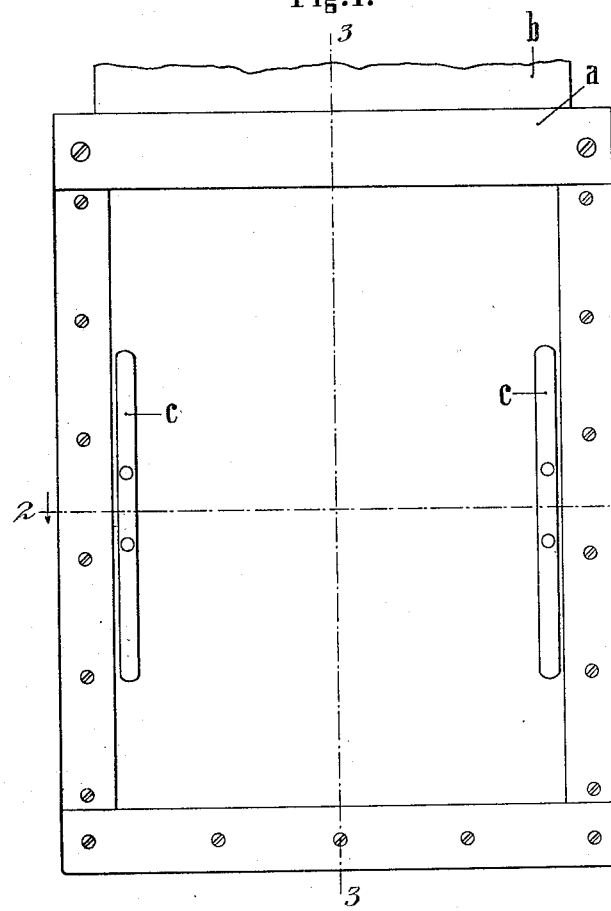
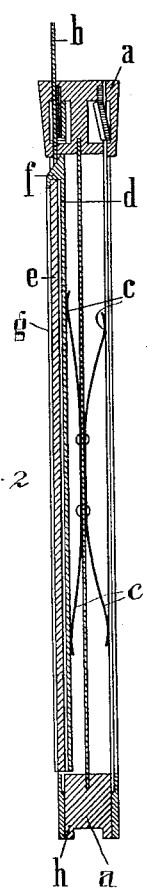
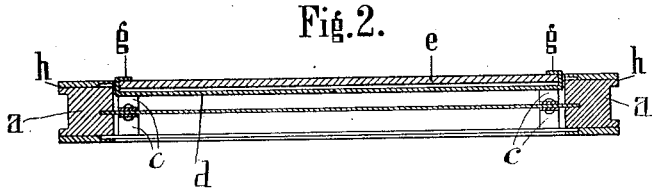

ERNST BRAUBURGER, OF FRIEDENAU, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PHOTOGRAPHIC-PLATE HOLDER.

1,199,238.  Specification of Letters Patent.  Patented Sept. 26, 1916.

Application filed November 13, 1912. Serial No. 731,151.

*To all whom it may concern:*

Be it known that I, ERNST BRAUBURGER, a citizen of the German Empire, and resident of Friedenau, near Berlin, Germany, have invented certain new and useful Improvements in and Relating to Photographic-Plate Holders, of which the following is a specification.

My invention relates to a photographic plate holder especially for use in connection with photographic cameras for photogrammetrical, spectrographical and other scientific purposes where it is essential that the distance between the objective and the sensitive surface is absolutely identical for a plurality of exposures made on photographic plates contained within different plate holders.

The invention is illustrated on the accompanying drawing in connection with a double plate holder.

Figure 1 shows an embodiment of the new plate holder from the back side, Fig. 2 a cross-section on lines 2—2 of Figs. 1 and 3, and Fig. 3 a longitudinal section through the plate holder on lines 3—3 of Figs. 1 and 2.

The plate holder frames is designated $a$.

$b$ is a dark slide adapted to control the exposing opening of the plate holder; $c, c$ are springs provided at both sides of the plate holder space; $d$ is a carrying frame for a plate $e$; $f$ is a wedge shaped frame member of the carrying frame $d$ provided at the top side of the exposing opening.

$g$ are lateral flanges of the frame $d$ which form guide-ways for plate $e$ within said carrying frame.

$h$ are lateral ledges adapted to be inserted into suitable guide-ways of a photographic camera for bringing the plate holder into position for exposing a sensitive plate contained therein.

The operation of the new plate holder is as follows: Assuming the plate holder containing a plate $e$ and having its exposing opening closed by dark slide $b$ is connected to a photographic camera and an exposure is to be made, then the dark slide is pulled out so that the exposing opening is uncovered. Springs $c$ push the frame $d$ with plate $e$ toward the exposing opening till flanges $g$ or the sensitive surface itself come into abutment with parts of the camera lying within the path of frame $d$ with plate $e$. Thus the fixed abutment members of the camera control the position of the sensitive surface during the exposure; therefore this position is independent from the dimensions of the plate holder and is always the same in spite of eventual use of differently sized plate holders. Cameras designed for making exposures for photogrammetric purposes are usually provided with adjustment or measuring members; these may advantageously be used as stop members for limiting the forward movement of the plate taking place when such cameras are connected with the new plate holder and the dark slide of same is opened. After the exposure is made the carrying frame $d$ with plate $e$ is automatically pushed back into the holder compartment on closing the dark slide $b$ by the contact of the front edge of the dark slide with the inclined surface of the wedge shaped upper frame member $f$.

What I claim is:—

1. A photographic plate holder provided with an exposure opening, and with a dark slide insertible in said plate holder to cover said opening, means freely and unobstructedly movable into and out of said exposure opening and adapted to support a sensitive plate for exposure, and means for actuating said movable plate supporting means.

2. A photographic plate holder provided with an exposure opening and with a dark slide insertible in said plate holder to cover said opening, means, freely and unobstructedly movable into and out of said exposure opening and adapted to support a sensitive plate for exposure, means for automatically projecting said plate supporting means through said opening when said dark slide is withdrawn, and means for automatically returning said supporting means through said opening into said plate holder when said dark slide is returned to its closed position.

In testimony whereof I have signed this specification in the presence of two subscribing witnesses.

ERNST BRAUBURGER.

Witnesses:
 WOLDEMAR HAUPT,
 HENRY HASPER.

Copies of this patent may be obtained for five cents each, by addressing the "Commissioner of Patents, Washington, D. C."